Figure 1:
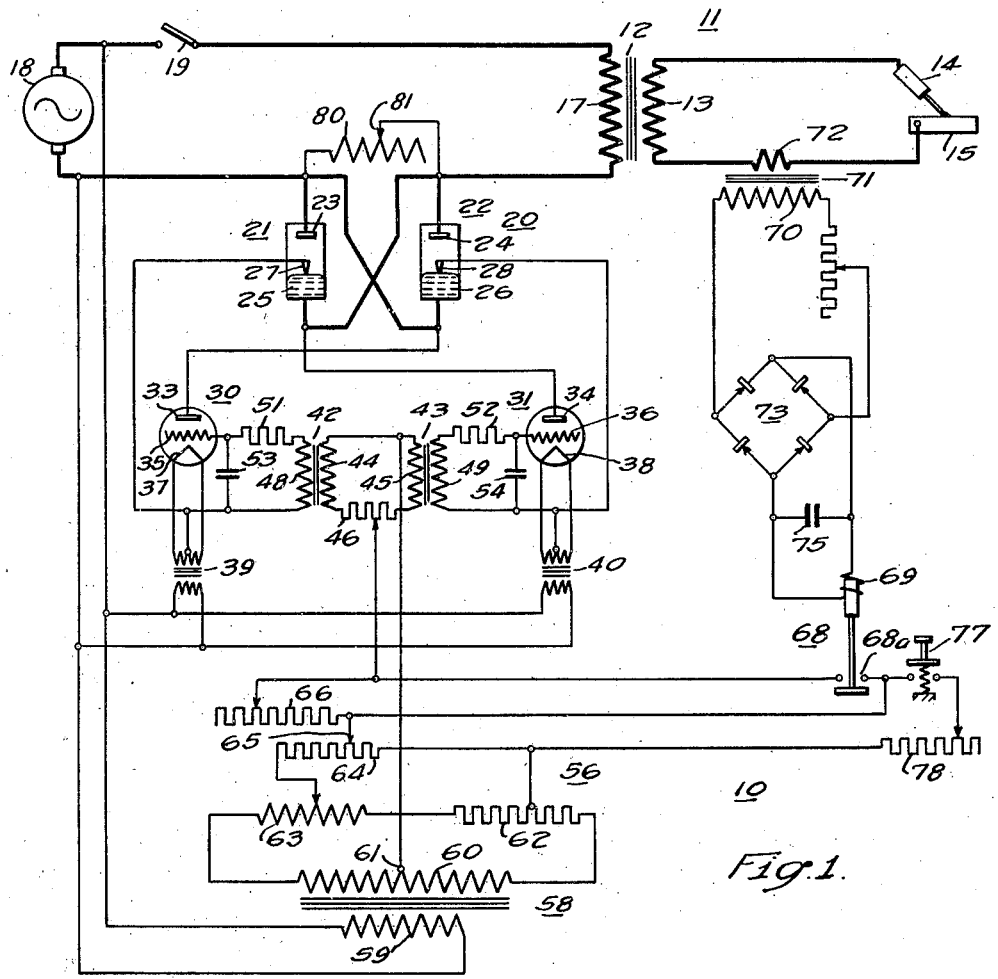

March 20, 1945.　　A. B. WHITE　　2,372,146

ARC WELDING SYSTEM

Filed Jan. 8, 1943

WITNESSES:

INVENTOR
Alfred B. White.
BY
ATTORNEY

Patented Mar. 20, 1945

2,372,146

UNITED STATES PATENT OFFICE 2,372,146

ARC WELDING SYSTEM

Alfred B. White, Murrysville, Pa., assignor to Westinghouse Electric & Manufacturing Company, East Pittsburgh, Pa., a corporation of Pennsylvania Application January 8, 1943, Serial No. 471,643

7 Claims. (Cl. 315—206)

My invention relates, generally, to welding and it has reference, in particular, to electric arc welding systems.

Generally stated, it is an object of my invention to provide an improved arc welding system which shall be of simple and economical construction and which shall function to produce improved results.

A more specific object of my invention is to provide for controlling the average value of the current in an alternating current arc welding system by means of arc discharge devices.

Another object of my invention is to provide for using phase controlled valve means for supplying electrical power to an alternating current arc.

A further object of my invention is to provide heat control in an electric arc welding system and prevent extinguishing of the arc at current zero.

It is also an object of my invention to provide for controlling the portion of each half cycle during which the principal arc current flows, and provide an auxiliary arc current of at least the minimum value necessary to maintain the arc during the no-current portions of the principal arc current in each half cycle.

A still further object of my invention is to provide for using arc discharge devices for controlling the heat in an alternating current arc welding system, and controlling the conductivity of the arc discharge devices to provide increased current during initiation and decreased current prior to extinction of the arc.

Other objects will in part be obvious, and will in part be explained hereinafter.

In practicing my invention in one embodiment thereof, a pair of inversely-connected arc discharge devices are connected in series circuit relation with an arc welding circuit and a source of alternating current. The conductivity of the arc discharge devices is controlled by grid controlled valves through a phase shifting circuit energized from the source, so that predetermined portions of each half cycle of alternating current are supplied to the welding circuit. A bypass impedance connected in shunt relation with the arc discharge devices supplies a minimum current necessary to maintain the arc during the dead portions in each half cycle when the arc discharge devices are non-conductive. Control means are provided for automatically increasing the arc current during initiation of the arc and decreasing the arc current to prevent crater formation just prior to the termination of a welding process.

Figure 2:
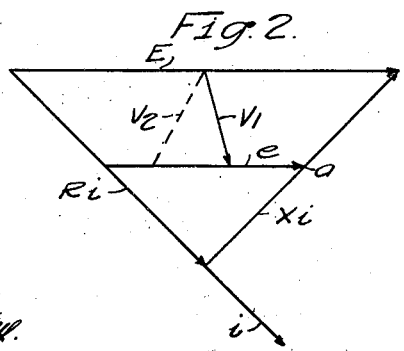

For a more complete understanding of the nature and scope of my invention reference may be made to the following description which may be read in connection with the accompanying drawing in which:

Figure 1 is a diagrammatic view of an arc welding system embodying the principal features of the invention; and Fig. 2 illustrates vectorially the variation in voltages produced by the phase shift control used in the welding system of Fig. 1.

Referring to Figure 1, the reference numeral 10 may denote, generally, an arc welding system comprising an arc welding circuit 11 which may include a welding transformer 12 having secondary winding 13 connected to a welding electrode 14 and work 15 upon which a welding operation is to be performed. The primary winding 17 of the welding transformer 12 may be connected to a source of alternating current 18 by switch means denoted, generally, by the numeral 20. A control switch 19 may be provided for disconnecting the welding system from the source.

In order to provide for connection of the welding transformer 12 to the source 18 during predetermined portions only of each half cycle of the source current wave, the switch means 20 may comprise a pair of inversely connected arc discharge devices 21 and 22 having, respectively, anodes 23, 24, mercury pool cathodes 25, 26 and control or ignition electrodes 27, 28.

The period of conductivity of each of the arc discharge devices may be controlled by means of control valves 30 and 31, which may be of the arc discharge type, having anodes 33, 34, control grids 35, 36 and cathodes 37, 38, respectively. The cathodes may be energized in any suitable manner being, for example, connected by means of filament transformers 39 and 40 to the source 18.

The conductivity of the control valves 30 and 31 may be controlled by applying suitable control voltages to the control grids thereof by the grid transformers 42 and 43. The primary windings 44 and 45 of the grid transformers may be connected in parallel relation with a balancing resistor 46 connected between the terminals thereof at one end. The secondary windings 48 and 49 are connected between the cathodes and control grids of their respective valves through control resistors 51 and 52. Condensers 53 and 54 may be connected between the control grids and the cathodes of the valves stabilizing the voltages therebetween.

In order to provide for controlling the duration of the periods of conductivity of the arc discharge devices 20 and 21 in successive half cycles of the source of current wave, a phase shifting circuit 56 may be employed for varying the point in the current wave at which the arc discharge devices are rendered conductive. For example, a control transformer 58 may be provided having primary winding 59 connected to the source 18 and a secondary winding 60 having a center tap 61. A control resistor 62 and an adjustable reactor 63 may be connected across the secondary winding 60. A phase-shift resistor 64 may be bridged across portions of the control resistor and reactor, having an adjustable contact 65. The center tap 61 may be connected to one pair of terminals of the grid transformers 42 and 43 while the adjustable contact 65 provides a connection to the other pair of terminals of the current transformers through the balancing resistor 46.

In order to provide a relatively high starting current for an arc welding operation suitable means may be utilized for changing the grid bias voltage by reducing or removing the bias voltage from the control grids of the control valves, or by shifting the phase of the bias voltage. The bias voltage may be reduced initially by utilizing a bias control resistor 66 which reduces the bias voltage, and providing a control relay 68 having contact members 68a for shunting the bias control resistor 66 a predetermined time after the commencement of a welding operation so that the predetermined value of the bias voltage is then applied to the control grids of the control valves 30 and 31. Operation of the control relay 68 may be effected by connecting the operating winding 69 to the secondary winding 70 of a current transformer 71 having a primary winding 72 connected in series circuit relation with the welding electrode 14 and the work 15. For the purpose of providing a time delay action in the operation of the control relay 68 a rectifier bridge circuit 73 may be interposed between the operating winding 69 and the secondary winding 70 of the current transformer, and a condenser 75 may be connected in shunt relation between the rectifier circuit and the operating winding 69.

For the purpose of reducing the welding current prior to the termination of a welding operation to effect crater elimination a control switch 77 may be utilized for controlling the grid bias by connecting a resistor 78 in parallel circuit relation with a portion of the reactor 63 and control resistor 62 so as to shift the phase of the bias voltage applied to the grid transformers, thereby reducing the duration of the periods of conductivity of the arc discharge devices 21 and 22.

Since any reduction of the duration of the period of conductivity of the arc discharge devices 21 and 22 increases the non-conducting portion of each half cycle, any appreciable degree of heat control makes it difficult, if not impossible, to maintain the arc. Suitable circuit means may, therefore, be provided for maintaining a predetermined minimum arc current during the non-conducting periods of the arc discharge devices. For example, an impedance device such as the reactor 80 may be connected in shunt relation with the arc discharge devices to provide an auxiliary arc current of sufficient value to maintain the arc during non-conducting periods of the arc discharge devices. An adjustable tap 81 may be provided for varying the auxiliary current.

Referring to Fig. 2, the vector E may represent the secondary voltage of the control transformer 58 and $i$ may represent the secondary current. $Ri$ represents the impedance drop in the resistor 62 and $Xi$ the impedance drop in the reactor 63. The point $a$ is adjustable by reason of the adjustable connection to the reactor 63. The heat control potentiometer may be so connected that the voltage $e$ across the outside terminals is the vector sum of the partial $Xi$ and $Ri$ drops in the portions of the reactor and resistor across which it is connected. For a given current setting of the resistor tap 65, the voltage across the primaries of the grid transformers 42 and 43 may be represented by the vector $V_1$. When the control resistor 66 is initially in the grid circuit, the bias voltage is reduced, since less of it is applied across the grid transformer. When the crater control resistance 78 is introduced into the circuit by the closure of the control switch 77, the effective value of the phase-shift resistor 64 is reduced and the voltage across the control grids shifts to a position such as indicated by $V_2$, thus lagging the line voltage by a greater amount and retarding the firing point of the arc discharge devices 21 and 22 to a point later in the current cycle, or preventing their firing at all, depending on the adjustment of the resistance 78. In the latter instance the welding current is reduced to the minimum supplied by the reactor 80.

In performing a welding operation the switch 19 may be closed to apply voltage from the source to the welding transformer 12 through the arc discharge devices 21 and 22 which are alternately rendered conductive in successive half cycles through energization of their control electrodes by the control valves 30 and 31. The control valves are respectively rendered conductive when the alternating current bias voltages applied to their control grids are reduced in amplitude or shifted in phase relative to the source voltage so as to be less than the negative bias voltages required to maintain the valves non-conductive for given instantaneous positive source voltages applied between the anodes and the cathodes. By means of the phase-shift circuit the point in each half cycle at which the negative bias voltage reaches this point may be varied.

As soon as the electrode 14 is brought into engagement with the work 15, current flows in the welding circuit, and a voltage is applied to the operating winding 69 of the control relay 68. After a predetermined interval determined by the charging rate of the condenser 75, the relay operates closing contact member 68a and shunting out a portion of the control resistor 66, thereby increasing the bias voltage applied to the control grids and reducing the duration of the conductive intervals of the arc discharge devices 21 and 22 in each half cycle to a value such as to apply the normal welding current to the welding circuit. This normal value of welding current may readily be determined by adjustment of the heat control resistor 64 which may be calibrated in amperes.

By adjustment of the heat control resistor 64, the bias voltage applied to the control grids of the control valves 30 and 31 may be varied so that the control valves are rendered conductive earlier or later in sucessive half cycles, thereby varying the duration of the period of conductivity of the arc discharge devices 21 and 22. The "average" value of the current in each half cycle may thus be varied to produce different heating effects at the arc.

Prior to the termination of a welding operation the control switch 77 may be operated to connect the crater control resistor 78 in parallel circuit relation with a portion of the heat control resistor 64. The bias voltage applied to the control grids of the control valves 30 and 31 may thereby be shifted, so that they are not rendered conductive until later in their respective half cycles. The duration of the period of conductivity of the arc discharge devices 21 and 22 in each half cycle is thereby reduced so that the "average" value of the welding current is also reduced, thereby eliminating the usual crater at the termination of an arc welding operation.

From the above description and the accompanying drawing, it will be apparent that I have provided in a simple and effective manner for controlling the heat in an arc welding system. The control means may be readily built into the welding transformer or made as a separate unit for use with different transformers. The effective value of the welding current may be readily controlled without fear of extinguishing the arc as the current is reduced to the lower values through heat control, since a minimum arc sustaining current is provided.

In actual practice, a minimum current of 100 amperes was provided by a reactor having an impedance of about 16 ohms and a kva. rating of one-fifth the transformer rating with a 500 ampere welder having a 440 volt primary. A reactance supplying a minimum current of 60 amperes gave good results with a 500 ampere welder operating at 135 amperes, whereas without the reactor the minimum current at which satisfactory operation could be secured was 250 amperes.

Initiation of the arc and initial penetration is greatly facilitated by providing increased welding current during the initiating periods and crater elimination is successfully secured by reducing the welding current at the termination of the welding operation. These variations of the welding current may be readily obtained through controling the duration of the periods of conductivity of the control valves in each half cycle of the alternating current. The control means for effecting these current changes are light and compact, and may be easily transported by the operator, so that control of the welding current may be readily effected at the point of welding and remote from the welding transformer and its associated control.

Since certain changes may be made in the above construction, and different embodiments of the invention may be made without departing from the scope thereof, it is intended that all the matter contained in the above description or shown in the accompanying drawing shall be interpreted as illustrative and not in a limiting sense.

I claim as my invention:

1. An arc system comprising, an arc circuit having spaced electrodes for maintaining an arc, valve means connecting the arc circuit to a source of alternating current, said valve means being rendered conductive for different predetermined portions of each half cycle thereof for providing heat control by supplying different predetermined average values of arc current to the arc circuit, and circuit means connecting the arc circuit to the source to supply an auxiliary arc sustaining current on the order of 20% of the rated value of the arc system during at least the portions of each half cycle when the valve means are nonconductive.

2. In an arc welding system in combination, an arc welding circuit including an electrode and work to be arc welded, valve means connecting the arc welding circuit to a source of alternating current, circuit means controlling the duration of conductivity of the valve means during each half cycle of the source, and means responsive to the energization of the arc welding circuit operable to increase the duration of conductivity of the valve means for a predetermined time after energization of the arc welding circuit.

3. An arc welding system comprising, an arc welding circuit, a pair of inversely connected arc discharge devices connecting the arc welding circuit to a source of alternating current for determining the value of the current in the arc welding circuit, valve means having control electrodes operable upon energization thereof to render the discharge devices conductive during predetermined portions of alternate half cycles, phase shift means controlling the energization of the control electrodes adjustable to vary the duration of the conductive periods of the arc discharge devices and predetermined different values of current in the arc welding circuit, and an impedance connected in shunt relation with the arc discharge devices for supplying only the minimum current necessary to maintain an arc during the non-conductive portions of the arc discharge devices.

4. An arc system comprising, an arc circuit including arcing electrodes and a transformer connecting them to a source of alternating current, valve means connected in series relation with the transformer and source, circuit means controlling the period of conductivity of the valve means during each half cycle, control means responsive to energization of the arc circuit, said means being operable to vary the circuit means to provide increased arc current for a predetermined time after energization of the arc circuit, and additional control means operable to vary the circuit means to decrease the arc current.

5. An arc welding system comprising, an arc welding circuit, a pair of inversely connected arc discharge devices connecting the welding circuit to a source of alternating current, circuit means including phase shift means effective to vary the duration of the period of conductivity of the discharge devices in each half cycle to produce different predetermined effective values of arc current, and an impedance connected in shunt relation with the arc discharge devices to supply a predetermined minimum arc current on the order of 10–20% of the rated current value of the system independently of the arc discharge devices for maintaining the arc during the non-conductive portion of each half cycle.

6. An arc welding system comprising, an arc welding circuit including an arc electrode, work and a transformer for connecting the arc electrode and work to a source of alternating current, a pair of inversely connected arc discharge devices connected in series relation with the transformer and source, said arc discharge devices having anodes, control electrodes and mercury pool cathodes, inductance means connecting the anodes to provide a predetermined minimum welding current to sustain an arc, control means including a phase shift network connected to the source and valve means of the arc discharge type controlling the energization of the control electrodes of the arc discharge devices to render said devices conductive for selected portions of alternate half cycles of the source to produce an average normal welding current, and means controlling the control means to vary the welding current predetermined amounts above and below the normal welding current.

7. An arc welding system comprising, an arc welding circuit including work and an arc electrode for maintaining an arc with the work, a pair of inversely connected arc discharge devices connecting the arc welding circuit to a source of alternating current for supplying a principal portion of the welding current to the welding circuit, control means manually adjustable to render the arc discharge devices non-conductive during different predetermined portions of the half cycles in which they conduct so as to provide different predetermined values of arc welding current, and impedance means connected in shunt relation with the arc discharge devices to provide only a current of the minimum value necessary to sustain an arc during non-conductive portions of said half cycles.

ALFRED B WHITE.